United States Patent
Grelaud et al.

(10) Patent No.: US 11,077,851 B2
(45) Date of Patent: Aug. 3, 2021

(54) METHOD AND DEVICE FOR SWITCHING OVER FROM A FIRST DRIVER ASSISTANCE FUNCTION TO A SECOND DRIVER ASSISTANCE FUNCTION

(71) Applicant: Robert Bosch GmbH, Stuttgart (DE)

(72) Inventors: Mathieu Grelaud, Ludwigsburg (DE); Michael Schoenherr, Renningen-Malmsheim (DE)

(73) Assignee: Robert Bosch GmbH, Stuttgart (DE)

( * ) Notice: Subject to any disclaimer, the term of this patent is extended or adjusted under 35 U.S.C. 154(b) by 150 days.

(21) Appl. No.: 16/549,456

(22) Filed: Aug. 23, 2019

(65) Prior Publication Data

US 2020/0062254 A1    Feb. 27, 2020

(30) Foreign Application Priority Data

Aug. 27, 2018 (DE) .......................... 102018214421.4

(51) Int. Cl.
*B60W 30/16* (2020.01)
*B60W 50/08* (2020.01)

(52) U.S. Cl.
CPC .......... *B60W 30/162* (2013.01); *B60W 50/08* (2013.01); *B60W 2300/36* (2013.01); *B60W 2554/801* (2020.02); *B60W 2554/804* (2020.02); *B60W 2720/106* (2013.01)

(58) Field of Classification Search
CPC ............... B60W 30/162; B60W 50/08; B60W 2554/804; B60W 2554/801; B60W 2720/106; B60W 2300/36
See application file for complete search history.

(56) References Cited

U.S. PATENT DOCUMENTS

2019/0248367 A1* 8/2019 Knitt ..................... B60W 30/16
2020/0398841 A1* 12/2020 Maeda ................ B60W 30/165

FOREIGN PATENT DOCUMENTS

DE      102017201693 A1    8/2018
JP      2017039488      *  2/2017    ............. B62J 99/00

OTHER PUBLICATIONS

Dealerworld, "KTM Scores points in Battle to be collision avoidance 'techmeisters'", Jun. 13, 2018, International Dealer News, pp. 1-2 (Year: 2018).*

* cited by examiner

*Primary Examiner* — Peter D Nolan
*Assistant Examiner* — Kenneth M Dunne
(74) *Attorney, Agent, or Firm* — Norton Rose Fulbright US LLP; Gerard Messina

(57) ABSTRACT

A method for switching over from a first driver assistance function to a second driver assistance function in a two-wheeled vehicle; one of the driver assistance functions being an adaptive distance and speed control function, and the other driver assistance function being a cruise control function; the switchover being accomplished by uninterrupted manipulation of an actuating element by the driver over a time interval of predefined length.

10 Claims, 1 Drawing Sheet

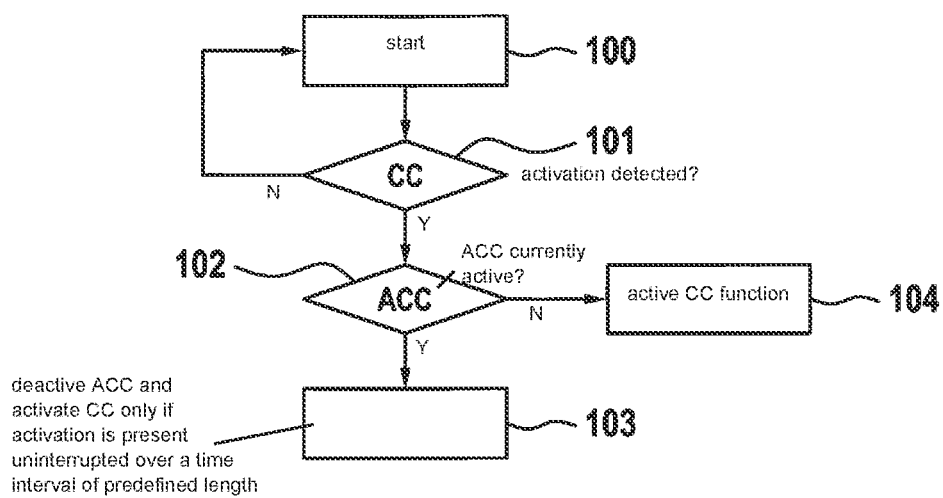

METHOD AND DEVICE FOR SWITCHING OVER FROM A FIRST DRIVER ASSISTANCE FUNCTION TO A SECOND DRIVER ASSISTANCE FUNCTION

RELATED APPLICATION INFORMATION

The present application claims priority to and the benefit of German patent application no. 10 2018 214 421.4, which was filed in Germany on Aug. 27, 2018, the disclosure of which is incorporated herein by reference.

FIELD OF THE INVENTION

The present invention relates to a method for switching over from a first driver assistance function to a second driver assistance function.

BACKGROUND INFORMATION

Patent document DE 10 2017 201 693 A1 discusses a method for influencing a longitudinal distance control system of a two-wheeled motor vehicle, in particular, of a motorcycle, where it is ascertained if, in addition to the rider, a further rider or passenger is on the motor vehicle, and where the longitudinal distance control system is influenced as a function of the presence of a further rider. In this context, e.g., with the aid of an operating element on the instrument cluster, the driver may specify if a further rider is traveling along.

SUMMARY OF THE INVENTION

The present invention relates to a method for switching over from a first driver assistance function to a second driver assistance function in a two-wheeled vehicle; one of the driver assistance functions being an adaptive distance and speed control function, and the other driver assistance function being a cruise control function; the switchover being accomplished via continuing or uninterrupted manipulation of an actuating element or push-button switch by the driver over a time interval of predefined length. In this manner, it is ensured that the driver manipulates the operating element intentionally.

One advantageous refinement of the present invention is characterized in that the first driver assistance function is an adaptive distance and speed control function and the second driver assistance function is a speed control function or cruise control function.

One advantageous refinement of the present invention is characterized in that the actuating instrument is a push-button switch.

One advantageous refinement of the present invention is characterized in that the actuating element is the same push-button switch, which is used for activating the first driver assistance function.

One advantageous refinement of the present invention is characterized in that the time interval of predefined length is greater than two seconds.

One advantageous refinement of the present invention is characterized in that the time interval of predefined length is approximately three seconds.

One advantageous refinement of the present invention is characterized in that the actuating instrument is attached to the wheel fork of the two-wheeled motor vehicle.

One advantageous refinement of the present invention is characterized in that the two-wheeled motor vehicle is a motorcycle.

In addition, the present invention includes an apparatus having devices, which are configured to implement the methods according to the present invention. In this context, it is, in particular, a control unit, in which the program code for implementing the methods of the present invention is stored.

BRIEF DESCRIPTION OF THE DRAWING

FIG. 1 shows an example of a flow chart of a method for switching over from a cruise control function to an ACC function.

DETAILED DESCRIPTION

Some motorcycles are currently equipped with a cruise control function, which is also referred to as a CC function. In the future, these systems will be expanded to include a sensor system, which measures the distance to the vehicle traveling ahead and allows comfortable, automatic control of the speed, while simultaneously maintaining an appropriate distance from the vehicle traveling ahead. These systems are also referred to as adaptive cruise control systems, that is, ACC systems, or adaptive distance and speed control systems. These ACC systems will probably have a maximum speed between 140 km/h and 160 km/h, while the maximum speed of cruise control functions lies in the range of 200 km/h. That is, using an ACC function, the motorcycle rider does obtain more comfort and safety through the control of the distance to the front vehicle, but is also limited by a lower maximum speed.

If one would like to allow the user of a motorcycle to utilize the cruise control function above the maximum speed of the ACC system, there are the following alternatives:

Option 1:

For speeds greater than the maximum speed of the ACC system, for example, >160 km/h, the system switches over directly from an ACC mode to a cruise control mode. The advantage is that a more comfortable transition between the functions occurs, that is, the driver does not have to execute a plurality of operating steps. However, this may also become critical, if the user assumes that even at the high speed, the system is ascertaining the distance to the vehicle in front and using it for longitudinal distance control.

Option 2:

For speeds greater than the maximum speed of ACC, for example, >160 km/h, the driver must first select the cruise control function in an operator menu and, as an option, first deactivate the ACC function there, in order to be able to subsequently use the cruise control function. Now, by his/her deliberate selection, the user knows exactly which function is currently set. At the same time, however, this is cumbersome for the user.

Therefore, the transition, that is, the use of the cruise control function, should be configured to be as user-friendly as possible, and nevertheless, it must be clear to the user or rider, if an ACC or cruise control function is active. In this connection, an information item to the rider via a display is possibly insufficient, since in the case of motorcycles, this is not perceived very often.

The operating concept for the cruise control system or ACC system is intended to be reconfigured for the activation in such a manner, that no additional operating elements are needed, and nevertheless, the two functions may be activated alone in a highly simple manner, but that a switchover from an ACC mode to a cruise control mode requires a highly deliberate action of the rider. This is achieved in that, for the switchover from ACC to the cruise control function, an operating element or actuating element must remain actuated by the driver in an uninterrupted manner over a time interval of predefined length.

FIG. 1 shows an example of a flow chart of a method for switching over from a cruise control function to an ACC function. After the start of the method in block 100, in block 101, it is inquired if the rider would like to activate the cruise control function denoted by CC. This is recognizable, e.g., from the manipulation of a push-button switch provided for this. If this is not the case, then the method returns to block 100. However, if the desire of the rider for activation of the CC function is detected in block 101, then this is not activated immediately, but in block 102, it is initially inquired if an ACC function is currently active. If this is not the case, then, in block 104, the CC function is activated. If, however, an ACC function is currently switched on, then, in block 103, the ACC function is optionally deactivated, but the CC function is only activated, if, in block 103, the activation command of the rider is present uninterrupted over a time interval of predefined length.

What is claimed is:

1. A method for switching over from a first driver assistance function to a second driver assistance function in a two-wheeled motor vehicle, the method comprising:
    detecting a manipulation by a driver of an actuating element;
    detecting that an adaptive distance and speed control function is currently active; and
    based on the detecting that the adaptive distance control and speed control function is currently active, switching over from the adaptive distance and speed control function to a cruise control function by deactivating the adaptive distance and speed control function and activating the cruise control function;
    wherein the switching over is performed only when the manipulation by the driver of the actuating element is an uninterrupted manipulation of the actuating element by the driver over a time interval of predefined length to accomplish the switchover; and
    wherein the adaptive distance and speed control function has a lower maximum speed than a maximum speed of the cruise control function.

2. The method of claim 1, wherein the actuating element is a push-button switch.

3. The method of claim 2, wherein the push-button-switch is the same push-button switch is used for activating the adaptive distance and speed control function.

4. The method of claim 1, wherein the time interval of predefined length is greater than two seconds.

5. The method of claim 4, wherein the time interval of predefined length is approximately three seconds.

6. The method of claim 1, wherein the actuating element is attached to the wheel fork of the two-wheeled motor vehicle.

7. The method of claim 1, wherein the two-wheeled motor vehicle includes a motorcycle.

8. An apparatus for switching over from a first driver assistance function to a second driver assistance function in a two-wheeled motor vehicle, comprising:
    a device configured to perform the following:
        detecting a manipulation by a driver of an actuating element;
        detecting that an adaptive distance and speed control function is currently active; and
        based on the detecting that the adaptive distance control and speed control function is currently active, switching over from the adaptive distance and speed control function to a cruise control function by deactivating the adaptive distance and speed control function and activating the cruise control function;
        wherein the switching over is performed only when the manipulation by the driver of the actuating element is an uninterrupted manipulation of the actuating element by the driver over a time interval of predefined length to accomplish the switchover; and
        wherein the adaptive distance and speed control function has a lower maximum speed than a maximum speed of the cruise control function.

9. The apparatus of claim 8, wherein the actuating element is a push-button switch.

10. The apparatus of claim 9, wherein the push-button-switch is the same push-button switch used for activating the adaptive distance and speed control function.

* * * * *